No. 726,794. PATENTED APR. 28, 1903.
C. S. BONNEY.
PLIERS.
APPLICATION FILED AUG. 13, 1902.
NO MODEL.

Witnesses
Inventor
C. S. Bonney
By
Attorneys

UNITED STATES PATENT OFFICE.

CHARLES S. BONNEY, OF PORTSMOUTH, OHIO.

PLIERS.

SPECIFICATION forming part of Letters Patent No. 726,794, dated April 28, 1903.

Application filed August 13, 1902. Serial No. 119,555. (No model.)

*To all whom it may concern:*

Be it known that I, CHARLES S. BONNEY, a citizen of the United States, residing at Portsmouth, in the county of Scioto and State of Ohio, have invented certain new and useful Improvements in Pliers, of which the following is a specification.

This invention relates to tools of the type comprising pivoted members having jaws for gripping the work or article to be held.

An essential feature is the provision of a tool of the character aforesaid which will firmly grip different sized and shaped objects, so as to prevent slipping.

A further purpose of the invention is to combine with a tool of the aforementioned type a cutting attachment of novel formation for severing wire, cutting nails, and analogous articles usually parted by cutting nippers and pliers.

For a full description of the invention and the merits thereof and also to acquire a knowledge of the details of construction of the means for effecting the result, reference is to be had to the following description and drawings hereto attached.

While the essential and characteristic features of the invention are susceptible of modification, still the preferred embodiment of the invention is illustrated in the accompanying drawings, in which—

Figure 1:
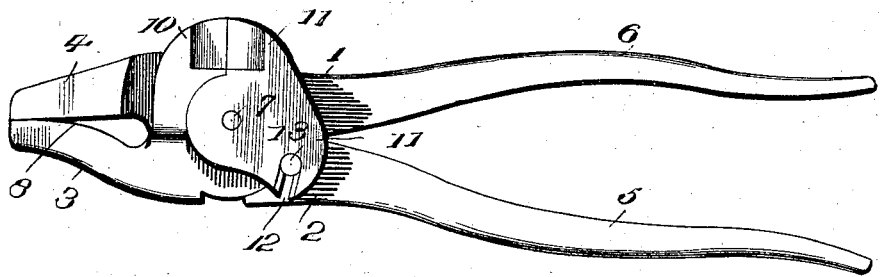
Figure 2:
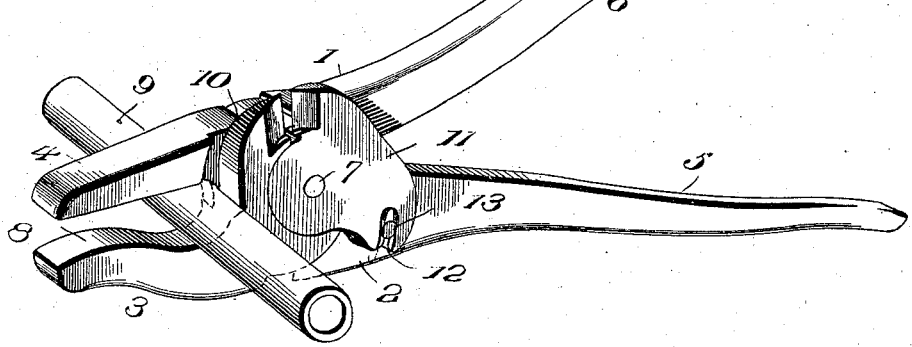
Figure 3:
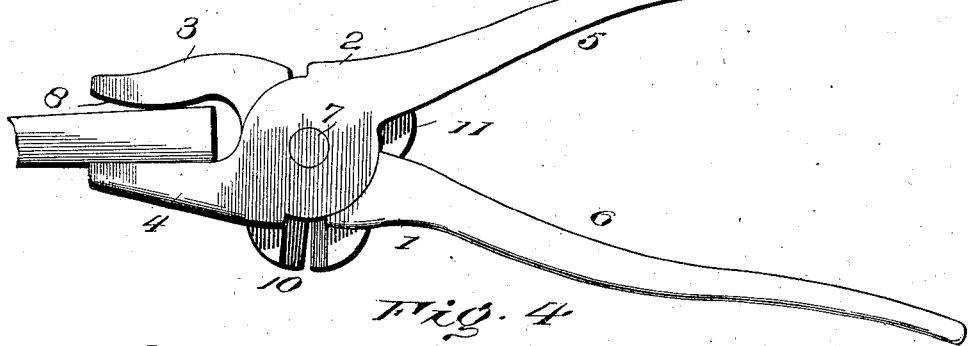
Figure 4:
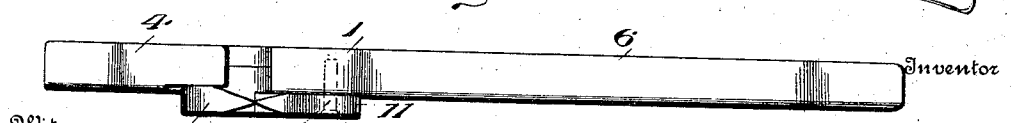

Figure 1 is a side elevation of a pair of pliers embodying the invention. Fig. 2 is a perspective view showing the pliers gripping a round object. Fig. 3 is a view similar to Fig. 1 of the reverse side of the pliers. Fig 4 is an edge view of the tool.

Corresponding and like parts are referred to in the following description and indicated in all the views of the drawings by the same reference characters.

The tool comprises relatively movable members 1 and 2, which are pivoted together near one end after the fashion of a pair of pliers, forming jaws 3 and 4 and handles 5 and 6. The member 1 is relatively fixed and the member 2 relatively movable, being adapted to be oscillated upon the pivot-fastening 7, connecting the members 1 and 2. The members 1 and 2 cross, and the hubs formed at the point of crossing are halved to admit of the outer sides of the members 1 and 2 coming flush. One of the jaws has its gripping-face straight and the other jaw has its gripping-face convex, as shown at 8, to admit of any size or shape of object being firmly gripped between the jaws. As shown in Fig. 2, the round object 9 rests in the hollow formed at the inner end of the jaw 3, and there is no tendency to expel the same from between the jaws when the handles 5 and 6 are pressed together to cause the jaws 3 and 4 to grip the part 9. If the faces of both jaws were straight, they would diverge outwardly upon opening the handles, and a large piece of work or object placed between the jaws would be forced outward upon pressing the handles 5 and 6 inward. By having one of the jaws, as 3, made convex upon its inner or gripping face the work or object is firmly and securely gripped when the handles 5 and 6 are pressed together.

The cutting attachment comprises cutters 10 and 11, the cutter 10 forming a part of the member 1 and the cutter 11 being loosely mounted upon the pivot-fastening 7 and adapted to coöperate with the cutter 10 for severing the work or article to be cut. The cutters 10 and 11 are located at one side of the pliers, and their nibs project beyond the member 1, as shown most clearly in Figs. 1 and 3, and are beveled upon opposite sides to form cutting edges, as indicated most clearly in Fig. 4. The pivoted cutter 11 is provided at the end opposite to the cutting-nib with a slot 12, in which operates a pin 13, projected laterally from the side of the movable member 2 subjacent to the cutter 11, whereby oscillation of the member 5 effects a corresponding movement of the cutter 11. The slot 12 is eccentric to the path of movement of the pin 13. Hence operation of the member 5 actuates the cutter 11. When the handles 5 and 6 are separated, the cutting-nibs of the cutters 10 and 11 are open, and when the handles 5 and 6 are pressed together said cutting-nibs are closed, and any work or object placed between said cutting-nibs is severed or parted in the well-known manner by the closing of the cutting edges of said nibs thereon. By having the cutting attachment at one side of the pliers it is entirely out of the way and admits of the free and unobstructed use of the jaws 3 and 4 throughout their length for gripping a variety of work. The slot 12 has its outer corners beveled, and the pin 13 has its outer end headed and constructed to snugly fit the beveled corners of the slot, thereby serving to prevent outward displacement of the cutter 11 without projecting beyond the outer side thereof. It is immaterial as to the location of the cutting attachment, as it may be arranged either upon the right-hand side or the left-hand side of the pliers or tool, as found most convenient.

Having thus described the invention, what is claimed as new is—

1. In combination, a tool comprising pivoted members arranged to provide coöperating jaws and handles, the jaws being rigid with the said handles, a fixed cutter projected laterally from one of the said members, a coöperating cutter pivotally mounted coaxially with the pivoted members of the tool, and a pin-and-slot connection between the pivoted cutter and the movable member of the tool for actuating the cutting attachment upon operating the movable members of the tool, substantially as set forth.

2. In combination, a tool comprising members arranged to provide coöperating jaws and handles, the jaws being rigid with the handles, a pivot-fastening connecting said members, a cutter projected laterally from one of the members, a companion cutter mounted upon the aforesaid pivot-fastening, and actuating means between the pivoted cutter and the operating member of the tool, substantially as described.

3. A tool comprising members arranged to provide operating jaws and handles, the jaws being rigid with the handles and one having a straight face and the other having its gripping-face made convex longitudinally, a cutter projected laterally from the convex member, a coöperating pivoted cutter, a pivot-fastening connecting the pivoted cutter and members of the tool, and actuating means between the cutter and operating member of the tool, substantially as specified.

4. The herein-described tool comprising a fixed member, a movable member, a pivot-fastening connecting the two members near one end, said members being arranged to provide coöperating jaws and handles, the gripping-face of one of the jaws being straight and the gripping-face of the other jaw being convex longitudinally, an integral cutter projected laterally from the convex member, a pivoted cutter mounted upon said pivot-fastening and having a slot eccentric to said pivot-fastening, and a pin projected laterally from the movable member and adapted to operate in the eccentric slot of the pivoted cutter for actuation thereof simultaneously with the operation of the movable member of the tool, the nibs of the cutters projecting beyond the outer side of a member of the tool, substantially as set forth.

In testimony whereof I affix my signature in presence of two witnesses.

CHARLES S. BONNEY. [L. S.]

Witnesses:
GENEVIEVE MATTHEWS,
GEORGE G. WATT.